Feb. 14, 1956
W. L. KAUFFMAN II
2,734,372
WRINGERS
Filed Nov. 21, 1951
4 Sheets-Sheet 1
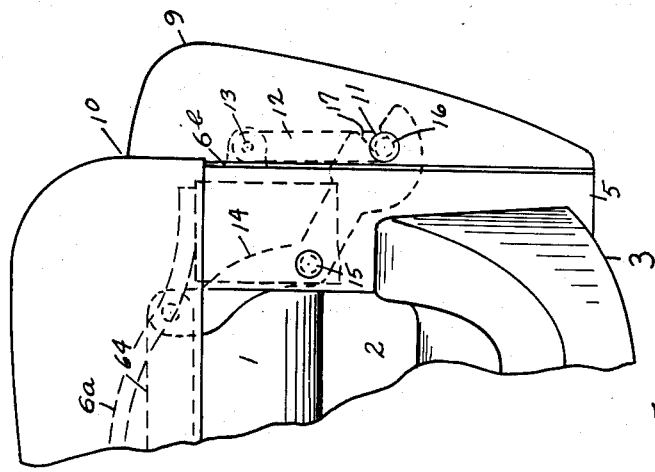
Fig. 1
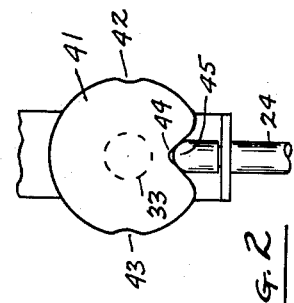
Fig. 2
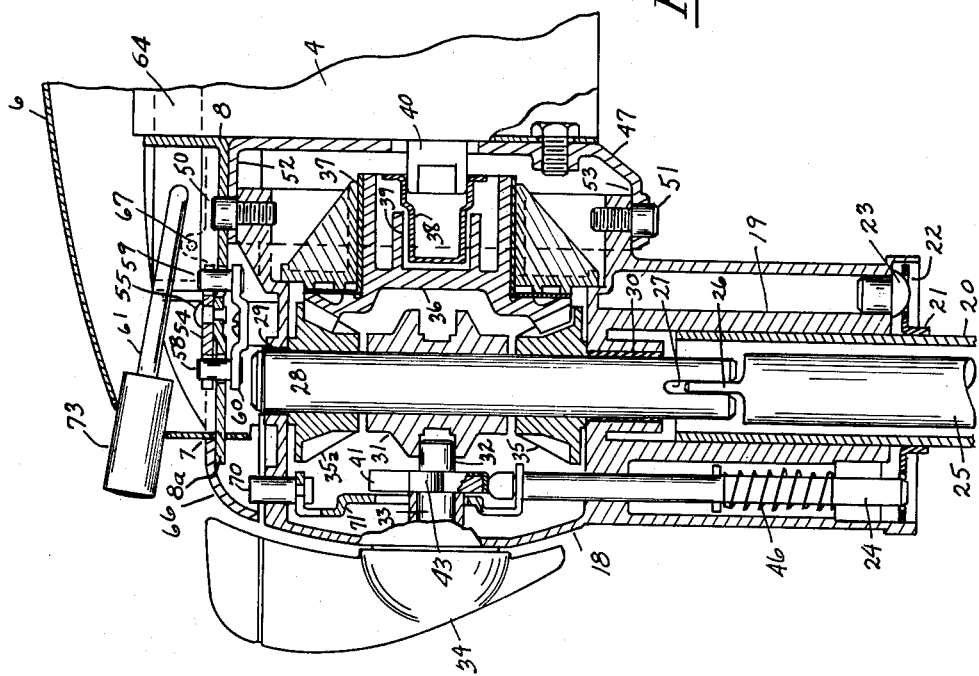
Inventor
Walter L Kauffman II
By Ralph Hammar
Attorney Feb. 14, 1956 W. L. KAUFFMAN II 2,734,372
WRINGERS Filed Nov. 21, 1951 4 Sheets-Sheet 3

Inventor
Walter L Kauffman II
Ralph Hammar
Attorney

Feb. 14, 1956   W. L. KAUFFMAN II   2,734,372
WRINGERS

Filed Nov. 21, 1951   4 Sheets-Sheet 4

Inventor
Walter L. Kauffman II
By
Ralph Hammar
Attorney

United States Patent Office 2,734,372
Patented Feb. 14, 1956

2,734,372
WRINGERS

Walter L. Kauffman II, Erie, Pa., assignor to Lovell Manufacturing Company, Erie, Pa., a corporation of Pennsylvania Application November 21, 1951, Serial No. 257,580

4 Claims. (Cl. 68—255)

This invention is a wringer in which the articulation of the frame relative to the head under the instinctive reflex action of the operator actuates a safety release of the roll pressure release type. Features include a mounting bracket for the wringer frame with cylindrical flanges having a sliding fit with complementary flanges on the wringer head to shroud the end of the head; a shroud for the top of the head serving as an interlock blocking articulation of the frame whenever the drive is in neutral and blocking unlocking of the index whenever the frame is articulated from its center position; a positive index lock which is biased out of locking position and serves as a detent for the gear shift lever; and an auxiliary release permitting release of pressure in the neutral position of the gears when the frame is locked against articulation so the instinctive release is blocked out.

Figure 3:
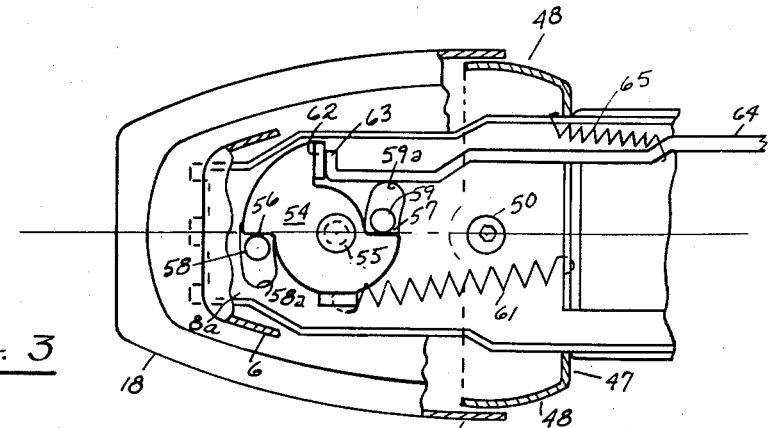
Figure 4:
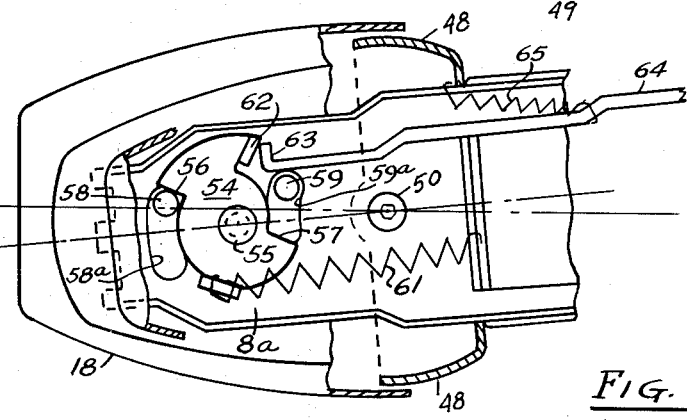
Figure 5:
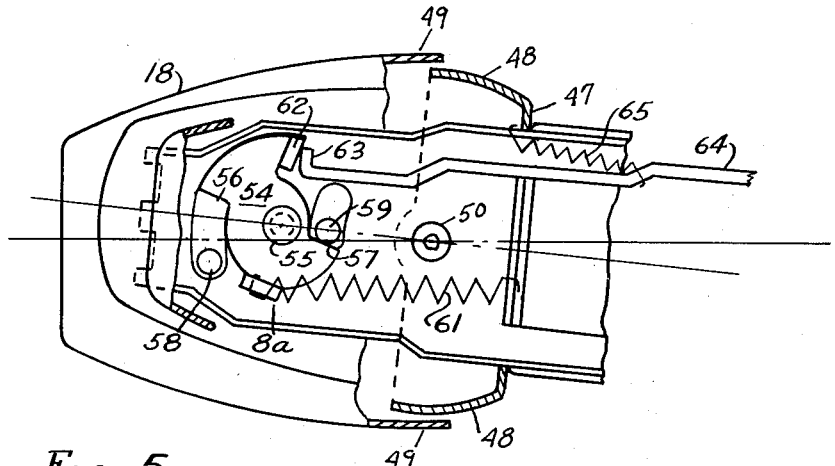
Figure 6:
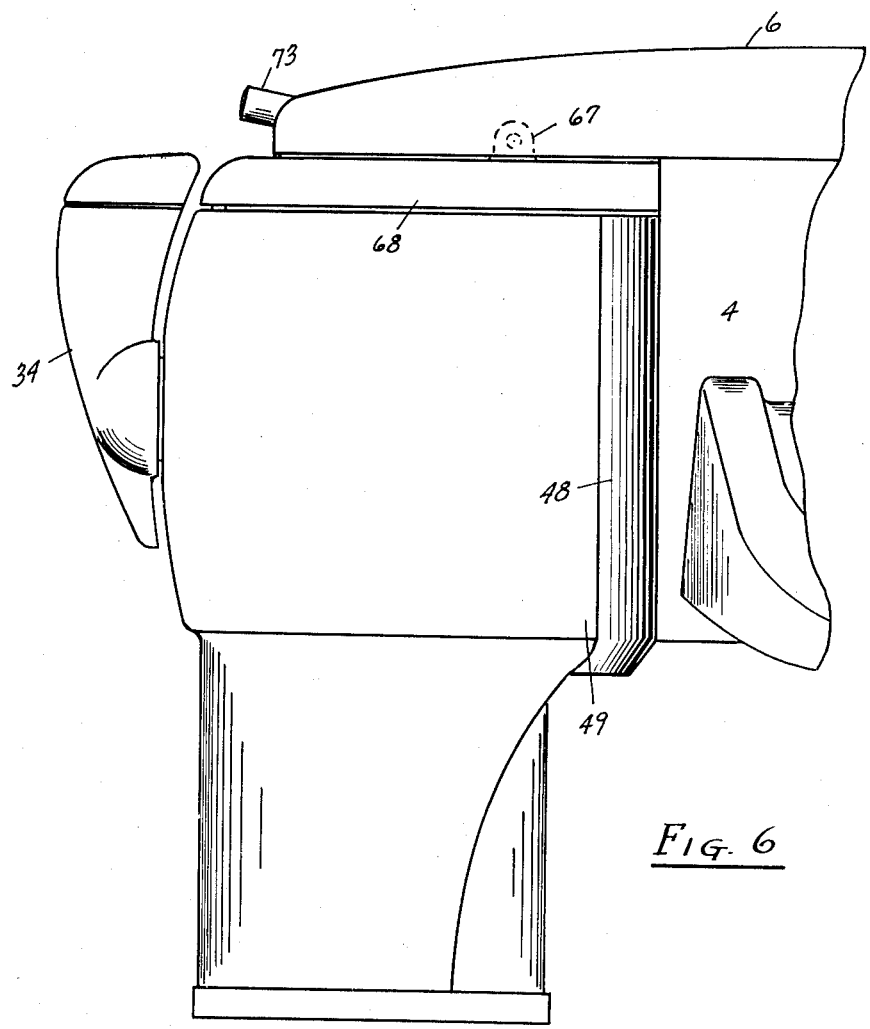
Figure 7:
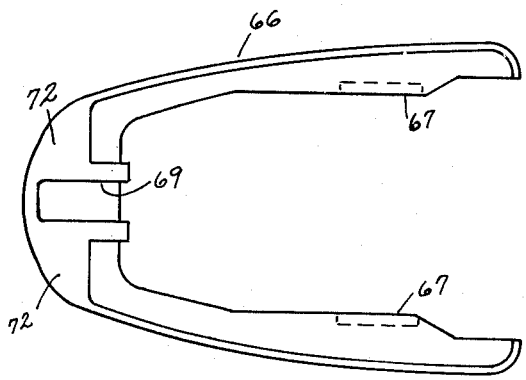
Figure 8:
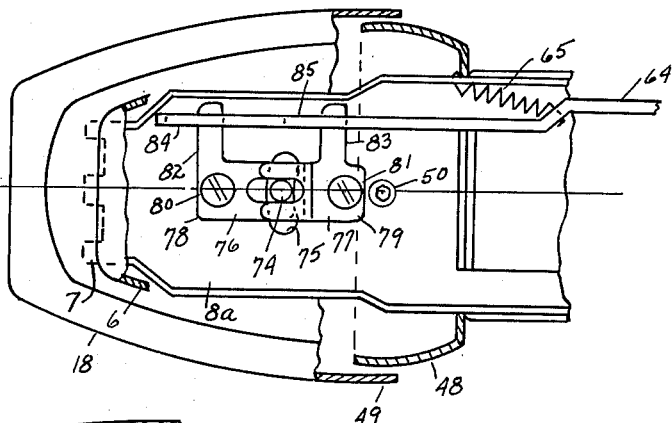
Figure 9:
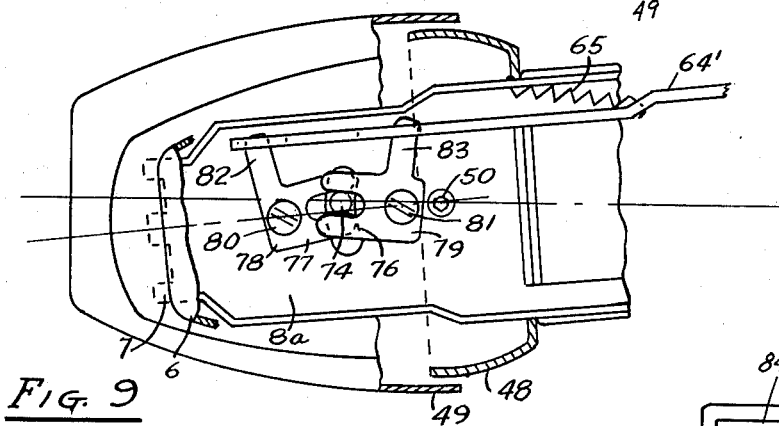
Figure 11:
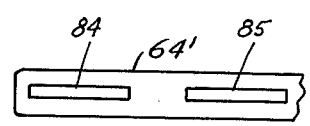
Figure 10:
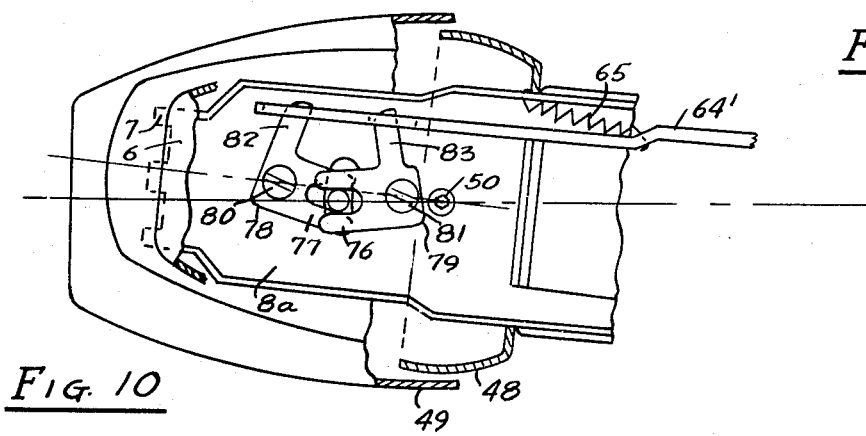

In the drawings, Fig. 1 is a side view, partly broken away; Fig. 2 is a fragmentary view showing the interlock of the positive index lock with the roll drive; Fig. 3 is a top view of the wringer in the centered position of the wringer frame; Figs. 4 and 5 are similar views showing the frame articulated from the centered position in opposite directions to actuate the instinctive pressure release; Fig. 6 is a side view of the head end of the wringer; Fig. 7 is a bottom view of the shroud for the top of the wringer head; Fig. 8 is a top view of a modification with the wringer frame in the centered position; Figs. 9 and 10 are similar views with the wringer frame articulated from the centered position to actuate the instinctive pressure release; and Fig. 11 is a fragmentary view of the link actuating the safety release.

Referring to the drawing, 1 and 2 indicate the upper and lower rolls; 3 the bottom frame having rigidly affixed thereto end frames 4 and 5; 6 the top frame suitably hinged at 7 by a tongue and slot connection to an extension 8a on a bracket 8 fixed to the end frame 4; 6a a roll pressure spring transmitting pressure from the top frame 6 to a roll bearing block 6b; 9 a toggle reset lever pivoted at 10 to the top bar and at 11 to a toggle link 12 pivoted at 13 on the end frame 5; and 14 a latch pivoted at 15 on the end frame 5 and having a catch 16 cooperating with the pivot 11 to hold the toggle links 9 and 12 in the pressure applying position illustrated in Fig. 1. Upon pivoting the latch 14 in a clockwise direction, the catch 16 is moved clear of the pivot pin 11 and a cam surface 17 cooperates with the pin to push the toggle links past dead center in case, due to manufacturing tolerances, the toggle links in the pressure applying position are over center. Upon actuation of the latch 14, the toggle links 9 and 12 swing endwise outwardly and upwardly away from the end frame 5 elevating the top frame 6 and releasing the pressure on the rolls. The parts so far described are or may be of common construction and have been sufficiently identified to define a wringer known in the trade as the toggle release type.

The wringer reversing drive is contained within a wringer head 18 having a depending sleeve 19 journaled on a wringer post 20 of a washing machine. The wringer post has fixed thereto an index collar 21 with suitably spaced index holes 22 therein cooperating with a dome-shaped pin 23 in the lower end of the sleeve to yieldably locate or index the wringer head in the selected index position. The holes 22 also cooperate with an index pin 24 of substantially smaller diameter than the index holes 22 to positively index the wringer head in the selected index position. The yielding index provided by the dome-shaped pin is always effective while, as hereinafter described, the positive index provided by the pin 24 is effective only while the rolls are being driven.

As is customary, the wringer post has journaled therein a vertical drive shaft 25 having a drive tongue 26 at its upper end received in a drive slot 27 in a shaft 28 journaled at 29 and 30 in the top and bottom walls of the wringer head. While the washing machine is operating, the shafts 25 and 28 are continuously driven. At the center of the shaft 28 is keyed a clutch member 31 which is moved up or down from the neutral position illustrated by an eccentric pin 32 fixed to a shaft 33 turned by a clutch control handle 34. In either the upper or lower positions of the clutch 31, the clutch engages one or the other of bevel gears 35, 35a loose on the shaft 28 and continuously meshing with a bevel gear 36 journaled in a bearing 37 and driving the lower roll 2 through a coupling 38 having one end seated in a socket 39 in the gear 36 and the other end engaging the shaft 40 for the lower roll 2. Both ends of the coupling 38 have tiltable but not rotatable engagement with the socket 39 and the shaft 40, respectively, so that misalignment of the shaft 40 with the gear 36 is accommodated. This is a common type of coupling.

The clutch control handle is yieldably held in the driving and neutral positions by a cam 41 fixed to the shaft 33 having shallow notches 42, 43 corresponding to the position of the shaft 33 in the two driving positions and having a deep notch 44 corresponding to the position of the shaft 33 in the neutral position. Each of the notches 42—44 cooperate with the rounded upper end 45 of the positive index pin 24 which is biased upwardly away from the positive index position by a compression spring 46. Each of the notches 42—44, inclusive, has cam-shaped sides so that the clutch shifting handle 34 can be turned but must first overcome the resistance offered by the engagement of the rounded end 45 with the selected notch. When the clutch shift lever is in the neutral position, the positive index pin is so elevated that it does not hold the wringer in the index position. While it might appear from Fig. 1 that the positive index pin was in the holding position, as the wringer head is pivoted from the index position, it is elevated by the rounded pin 23 so that the positive index pin in fact does not in any way restrain movement of the wringer head from the index position. However, when the index pin 24 engages either of the shallow notches 42, 43 the index pin is then depressed clear through one of the index holes and does serve as a positive index lock which positively prevents movement of the wringer head from selected index position. By having the notch 44 with relatively steep sides, the index pin 24 is depressed to the positive indexing position before the clutch 31 is moved into engagement with either of the gears 35, 35a. Likewise, upon movement of the clutch out of the driving position, the clutch 31 is disengaged from the gears before the index pin 24 is moved out of the positive indexing position. This sequence is important from a safety standpoint since the wringer head should not be movable from an index position except when the drive is in neutral.

In order to provide an instinctive or reflex release of the wringer pressure, the wringer frame is articulated to the wringer head so as to pivot thereabout under the instinctive or reflex action of the operator. The arrangement for articulating the wringer frame to the head comprises a bracket 47 fixed to the end frame 4 and having cylindrical vertical arcuate side walls 48 telescoped within complementary vertical side walls or flanges 49 on the wringer head. The walls 48 and 49 extend toward each other and interfit in the centered and articulated position of the frame and provide a complete enclosure or shrouding of the wringer head in all articulated positions of the wringer frame. This prevents what would otherwise be an unsightly gap between the wringer frame and the wringer head and furthermore prevents any blocking of the articulation by material coming between the bracket and the wringer head. The pivotal support for the bracket on the head comprises upper and lower shoulder screws 50, 51 threaded into the wringer head and having the heads thereof received in pivot holes in the top and bottom walls 52 and 53 of the mounting bracket. The screw 50 also extends through a pivot hole in the bracket 8 which is likewise fixed to the end frame 4 and from one aspect has an extension 8a overlying the top of the wringer head. The wringer frame can be removed from the wringer head by unthreading the bottom screw 51 and then lifting the wringer frame off the head by an upward and outward motion at the overhung end of the frame.

The linkage for actuating the pressure release by articulation of the wringer frame on the pivots 50, 51 comprises a cam 54 pivoted at 55 on the bracket extension 8a and having shoulders 56 and 57 on opposite sides of the pivot 55 cooperating with pins 58 and 59 on a bracket 60 fixed to the top of the wringer head. The pins 58 and 59 project through slots 58a and 59a in the bracket extension 8a. A tension spring 61 fastened between the mounting bracket 47 and the cam 54 urges the cam in a counter-clockwise direction, as viewed in Fig. 3, holding the shoulders 56 and 57 against the pins 58 and 59 and centering the cam on the bracket. In this position, a shoulder 62 on the cam engages a flange 63 on the end of a slide link 64 pivoted to the latch 14. No matter which direction the wringer frame is articulated relative to the wringer head, the cam 54 is turned in a clockwise direction (Figs. 4 and 5) and pushes the slide link to the right, as viewed in Fig. 1, moving the catch 16 clear of the pivot pin 11 and releasing the toggle 9, 12 to release the wringing pressure. To release the pressure as described above, it is necessary that the wringer frame be forcibly articulated relative to the head. Whenever the articulating force is released, the tension spring 61 returns the wringer frame to the centered position. Likewise a tension spring 65 urges the link 64 back to the position illustrated in Fig. 3. The spring 61 is really a centering spring which centers the frame on the wringer head while the spring 65 is primarily to return or hold the latch 14 in the latching position.

As the wringer frame is articulated relative to the head, it is obvious that the bracket extension 8a swings over the top of the head. It is desirable that the mechanism on top of the head remain enclosed in any articulated position of the wringer frame. This is accomplished by a horseshoe-shaped shroud 66 having upstanding ears 67 fastened to the side of the bracket extension 8a and having depending side and end walls 68 which extend from the bracket extension 8a down to the top of the wringer head and enclose the parts mounted on top of the wringer head. In addition to serving as a shroud, the bracket 66 also serves to block unlocking of the index whenever the wringer frame is articulated from its center position. This blocking of the index lock is accomplished by a recess 69 on the under side of the shroud 66 which in the centered position is aligned with a pin 70 on the upper end of a bracket 71 fixed to the positive index pin 24. The positive index pin 24 is biased upward by the spring 46 so that whenever the clutch shift handle 34 is in the neutral position, the pin 70 is urged upward. However, the pin cannot move upward unless the wringer frame is in the center position where the pin is aligned with the recess 69. Upon articulation of the wringer frame from the center position, the pin 70 is kept from moving upward by shoulders 72. Whenever the wringer frame is in its center position and the gears are in the neutral position, the pin 70 is elevated into the recess 69 and the wringer frame is positively locked relative to the wringer head. In this position, the wringer frame and head can be moved to a succeeding index position and the force applied to the wringer frame cannot actuate the pressure release. However, if the operator should wish to release the pressure when the wringer is in this condition, a knob 73 fastened to the link 64 and extending out the left-hand end of the top frame can be pushed inward thereby producing the same movement of the pressure release latch 14 as heretofore explained in connection with the instinctive release.

The modification shown in Figs. 8 to 11, inclusive, differs from the previously described construction only in the mechanism for actuating the safety release upon articulation of the wringer frame relative to the wringer head. Corresponding parts are indicated by the same reference numerals. In the centered position of the wringer frame relative to the wringer head 18, a pin 74 fixed to the wringer head occupies a central position in an arcuate slot 75 in the bracket extension 8a to which the wringer frame is fixed. The pin 74 is straddled by U-shaped arms 76 and 77 on bell crank levers 78 and 79 respectively pivoted at 80 and 81 on the bracket extension 8a. The other arms 82 and 83 of the bell crank levers 78 and 79 project through slots 84 and 85 in a link 64' which otherwise is of essentially the same construction as the link 64 for actuating the latch 14. The link 64' is biased to the left as indicated in Figs. 8 to 10, inclusive, by a tension spring 65 which holds the right-hand ends of the slots 84 and 85 firmly against the arms 82 and 83 of the bell crank levers. In this position, the bell crank levers 78 and 79 are centered, with respect to the bracket extension 8a, and the bracket 8, which is fixed to the wringer frame, is centered with respect to the wringer head. Upon pivoting of the wringer frame in either direction from the centered direction illustrated in Fig. 8, one or the other of the bell crank levers 78 and 79 is pivoted in a clockwise direction, as viewed in Figs. 9 and 10, to push the link 64' to the right and release the latch 14. In Fig. 9, it is the bell crank lever 79 which actuates the safety release latch 14, while in Fig. 10, it is the bell crank lever 78 which actuates the safety release latch. In both cases, the other bell crank lever, which is pivoted in a counter-clockwise direction from the centered position illustrated in Fig. 8, has no effect. With this arrangement, the amount of articulation of the wringer frame with respect to the wringer head required to actuate the safety release can be easily controlled so as to be the same amount for both directions of articulation.

What I claim as new is:

1. In a wringer, a wringer head, a frame overhanging one end of the head, a mounting articulating the frame to the head, means centering the frame relative to the head, said mounting including a bracket fixed to the frame and having an extension overlying the top of the head, a top frame hinged to the bracket extension, means holding the top frame against upward swinging, a safety release for said holding means, an actuator for the safety release responsive to articulation of the frame from the centered position relative to the head, a wringer drive control having a handle on the head movable to driving and neutral positions, an interlock between the drive control and the frame blocking articulation of the frame in the neutral but not in the driving positions, and a manual actuator for the safety release having a part on the top frame adjacent the head accessible for manual actuation for releasing the safety release whenever the drive control is in neutral position and articulation is blocked.

2. In a wringer, a post, a head mountable for swinging movement to any selected one of a plurality of angular index positions on said post, a wringer drive in the head movable to driving and neutral positions, an index pin for positively locking the head in the selected index position, means biasing the pin out of the locking position, a drive control shaft having a cam thereon cooperating with the index pin, said cam having detent notches receiving the pin in the driving and neutral positions and said cam being proportioned to force the index pin into the locking position in the driving position but not in the neutral position, a frame, wringer rolls in the frame adapted to be driven by said wringer drive, a mounting articulating the frame relative to the head, means centering the frame relative to the head, and an interlock carried by the pin for blocking articulation of the frame relative to the head in the neutral but not in the driving positions of the drive.

3. In a wringer, a wringer head, a frame overhanging one end of the head, a mounting bracket fixed to the frame having top and bottom walls, a mounting between the bracket and head articulating the frame to the head comprising pivots in said top and bottom walls, means centering the frame relative to the head, vertical arcuate flanges on the sides of the bracket extending from the bracket toward the head, spaced vertical complementary flanges on said one end of the head extending from the head toward the bracket, said flanges being in telescoping relation and interfitting in the centered and articulated positions of the frame and shrouding said one end of the head.

4. In a wringer, a wringer head, a roll carrying frame overhanging one end of the head and including roll pressure means, a mounting bracket fixed to the frame, a bracket extension overlying the top of the wringer head, a mounting between the bracket and head articulating the frame to the head, means centering the frame relative to the head, means for sustaining the roll pressure and including a pressure release, actuating means for the pressure release mounted on the bracket extension, said bracket extension having a clearance opening, and a pin on the head extending through the clearance opening in the bracket extension to the actuating means for moving the actuating means upon articulation of the bracket extension and the frame fixed thereto relative to the head from the centered position.

References Cited in the file of this patent

UNITED STATES PATENTS

| | | |
|---|---|---|
| 1,662,616 | Mitchell | Mar. 13, 1928 |
| 2,216,391 | Kauffman | Oct. 1, 1940 |
| 2,216,392 | Kauffman | Oct. 1, 1940 |
| 2,216,395 | Kauffman | Oct. 1, 1940 |
| 2,332,129 | Blough | Oct. 19, 1943 |
| 2,595,147 | Kauffman | Apr. 29, 1952 |